US008255679B2

(12) United States Patent
Mio et al.

(10) Patent No.: US 8,255,679 B2
(45) Date of Patent: Aug. 28, 2012

(54) RECEIVER AND RECEIVING METHOD (75) Inventors: Satoshi Mio, Yokohama (JP); Hiroyuki Koreeda, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 246 days.

(21) Appl. No.: 12/596,512

(22) PCT Filed: Mar. 4, 2008

(86) PCT No.: PCT/JP2008/053852
§ 371 (c)(1),
(2), (4) Date: Jun. 29, 2010

(87) PCT Pub. No.: WO2008/132877
PCT Pub. Date: Nov. 6, 2008

(65) Prior Publication Data
US 2010/0275006 A1 Oct. 28, 2010

(30) Foreign Application Priority Data

Apr. 20, 2007 (JP) ................................. 2007-111199

(51) Int. Cl.
*H04L 29/06* (2006.01)
*H04L 9/08* (2006.01)
(52) U.S. Cl. ....................................... 713/150; 380/278
(58) Field of Classification Search .................. 713/150; 380/278
See application file for complete search history.

(56) References Cited

U.S. PATENT DOCUMENTS

| 6,055,314 A * | 4/2000 | Spies et al. ..................... 380/228 |
| 2003/0149890 A1 * | 8/2003 | Shen et al. ..................... 713/200 |
| 2004/0103319 A1 | 5/2004 | Kato et al. |
| 2006/0053081 A1 | 3/2006 | Ito |
| 2007/0150963 A1 * | 6/2007 | Lee et al. ......................... 726/27 |
| 2007/0168287 A1 * | 7/2007 | McCarthy et al. ............... 705/51 |
| 2007/0171535 A1 * | 7/2007 | Shyu et al. ..................... 359/642 |
| 2009/0044241 A1 * | 2/2009 | Joo et al. ....................... 725/114 |

FOREIGN PATENT DOCUMENTS

| JP | 07-297820 | 11/1995 |
| JP | 09-307545 | 11/1997 |
| JP | 2002-057644 | 2/2002 |
| JP | 2003-174439 | 6/2003 |
| JP | 2004-179755 | 6/2004 |
| JP | 2006-040215 | 2/2006 |
| JP | 2006-079734 | 3/2006 |
| JP | 2006-203505 | 8/2006 |
| JP | 2006-319457 | 11/2006 |
| JP | 2007-36666 | 2/2007 |
| WO | WO 2005/004485 | 1/2005 |
| WO | WO 2005/004485 A1 | 1/2005 |

* cited by examiner

*Primary Examiner* — Krisna Lim
(74) *Attorney, Agent, or Firm* — Antonelli, Terry, Stout & Kraus, LLP.

(57) ABSTRACT

By deciding procedures for downloading content data and downloading key information, a safe service is provided for a content distributor and a method which can start playback before completion of the downloading of the content data is provided, thereby providing a technique easy for a user. A receiver has: an interface unit being adapted to download encoded content data and key information for decoding the content data from a communication line; a storage unit being adapted to store the downloaded content data and key information from the interface unit; and a control unit which decodes the content data outputted from the storage unit using the key information. The control unit downloads the key information after the content data is downloaded entirely.

12 Claims, 6 Drawing Sheets

RECEIVER AND RECEIVING METHOD

INCORPORATION BY REFERENCE

The present application relates to and claims priority from Japanese Patent Application No. 2007-111199 filed on Apr. 20, 2007, the entire disclosure of which is incorporated herein by reference.

TECHNICAL FIELD

The invention relates to a receiver and a receiving method for obtaining a digital content such as video image, audio sound, or the like by downloading and for storing and using the content.

BACKGROUND ART

In recent years, a digital broadcasting by a satellite or a terrestrial wave has generally been spread. On the other hand, a transmission of digital content data such as video image, audio sound, or the like via a broadband home communication network has been used.

According to those services, generally, the content such as video image, audio sound, or the like is compressed by a system such as MPEG or the like and transmitted in a format of a stream or a file. In a receiver, it is decompressed by a decoder and played back. If the receiver has a storing function, the received content is stored and may be played back as necessary later.

In the case of a service for providing a content such as video image, audio sound, or the like for a charge, there is a case where the content has been encrypted. When the content is read out from the storing function and played back, the encryption is decrypted by using key information obtained separately, thereby playing back the content (for example, refer to patent document 1).

Patent document 1: JP-A-2003-174439

DISCLOSURE OF THE INVENTION

Problem to be Solved by the Invention

Although timing for obtaining the key information is not mentioned particularly in the patent document 1, nothing is considered with respect to a point that if the key information for the content encryption was given to the user by downloading at timing before completion of the downloading of the content data such as timing just after a purchasing procedure of the content or the like, there is a possibility that he can illegally monitor the content by pretexting that the downloading of the content data has been interrupted on the halfway. With respect to such a problem, such a risk may be avoided by providing the key information after completion of downloading of the content data.

In a system for acquiring the key information after completion of downloading by the above method, there is such a problem that after the start of the downloading of the content data, if it is desired to start playback before the downloading is completed, the playback cannot be performed because there is no key information.

It is an object of the invention to provide a safety service for a content distributor by deciding a procedure of downloading of content data and that of key information and to provide a method which can start playback of the content data before completing downloading of it, thereby providing a technique easy for a user.

Means for Solving Problem

To solve the above problem, for example, a receiver has a construction comprising: an interface unit being adapted to download encoded content data and key information for decoding the content data from a communication line; a storage unit being adapted to store the downloaded content data and key information from the interface unit; and a control unit which decodes the content data outputted from the storage unit using the key information, wherein the control unit downloads the key information after the content data is downloaded entirely.

Advantages of the Invention

According to the invention, when the content is downloaded, by downloading the key information for the encryption after confirming that the downloading of the encoded content data has been completed, a possibility of an illegal use may be eliminated.

Other objects, features, and advantages of the present invention will be apparent from the following description of embodiments of the present invention taken in conjunction with the accompanying drawings.

BEST MODE FOR CARRYING OUT THE INVENTION

Embodiments of the invention will be described hereinbelow by using the drawings. The invention is not limited to examples illustrated in the drawings.

Embodiment 1

Figure 6:
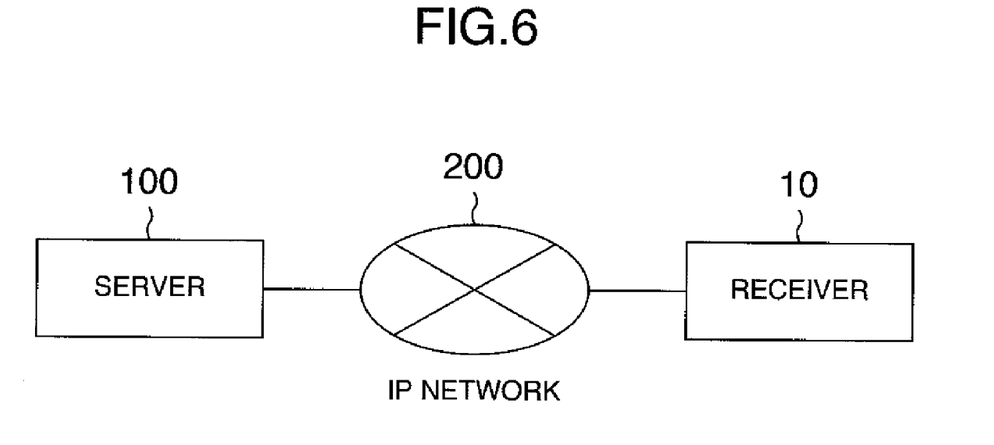
FIG. 6 is an example of a network construction to which the invention is applied.

In the case of playing back a video image by downloading, as shown in FIG. 6, a receiver 10 downloads content data and key information from a server 100 through an IP network 200. Although a server which distributes the content data and a server which distributes the key information are assumed to be the same server in FIG. 6, the server which distributes the key information may be provided separately from the server which distributes the content data.

Figure 1:
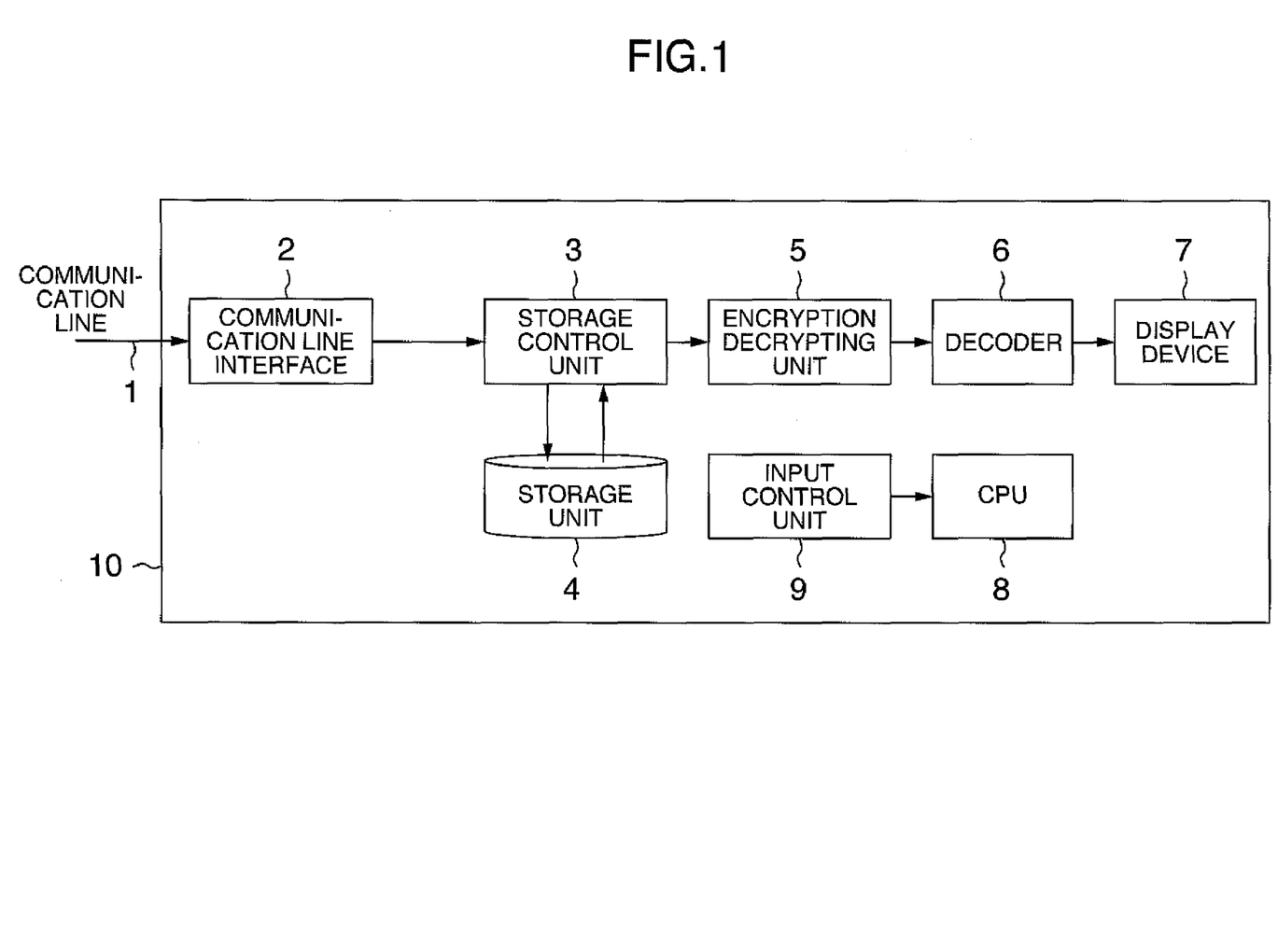
FIG. 1 is a block diagram showing a construction of a receiver according to the invention.

An example of a functional block diagram of a receiver to which the embodiment is applied is shown in FIG. 1. The receiver 10 connected to a communication line 1 has: a communication line interface 2; a storage control unit 3; a storage unit 4; an encryption decrypting unit 5; a decoder 6; a display device 7; a CPU 8; and an input control unit 9.

When the downloading is executed from the communication line 1 through the communication line interface 2 and the user selects a content from a menu in a Homepage or the like of a service for providing the content and executes a charging process for a purchase, data of the content including encrypted video image and audio sound is downloaded from the communication line 1 through the communication line interface 2. A download control metafile describing a downloading method is also downloaded from the communication line interface 2.

The storage control unit 3 is connected to the communication line interface 2 and stores the data such as content, key information, and the like downloaded through the communication line interface 2 into the storage unit 4.

The storage unit 4 is constructed by a memory medium which may store the downloaded content, such as HDD, optical disk, or the like. The storage unit 4 is connected to the storage control unit 3. The data of the content including the encrypted video image and audio sound and the key information for decoding the content data which were outputted from the storage control unit 3 are stored in the storage unit 4.

The encryption decrypting unit 5 decodes the encrypted content outputted from the storage unit 4 by using an encryption key outputted likewise from the storage unit 4.

The CPU 8 is constructed in such a manner that when the user instructs playback of the content through the input control unit 9 by a remote controller or the like (not shown), the content data and the key information for the encryption are read out of the storage unit 4 and inputted to the encryption decrypting unit 5, the encryption of the content data is decrypted, the decrypted content data is sent to the display device 7 through the decoder 6, and the data is played back.

Figure 2:
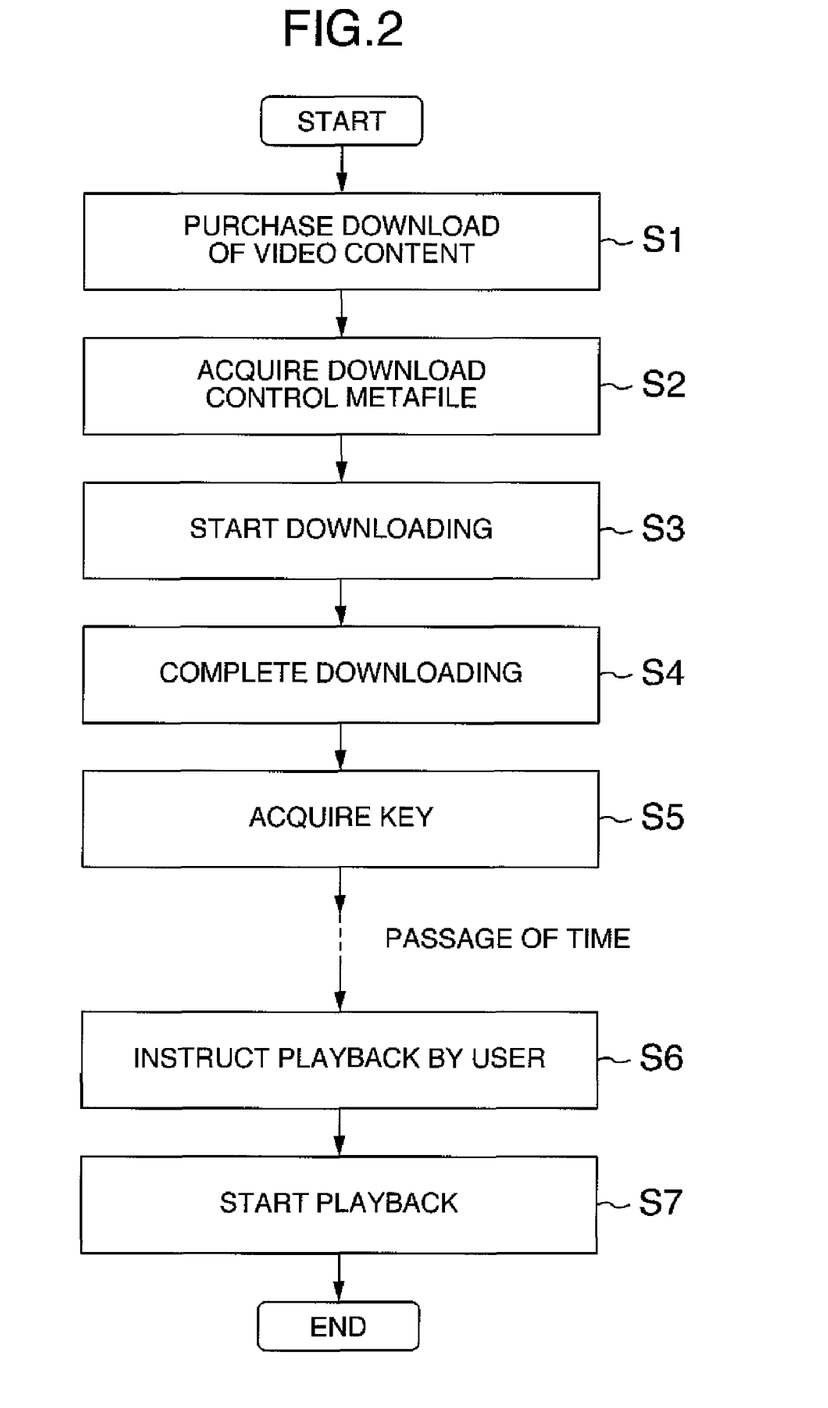
FIG. 2 is a flowchart showing the operation of a downloading process in an embodiment 1.

FIG. 2 is a flowchart showing the above operation. When the content is purchased by the downloading service (S1), the receiver 10 acquires the download control metafile describing the downloading method (S2) and the CPU 8 starts the downloading of the content data in accordance with it (S3). After that, when the CPU 8 confirms that the downloading has been completed (S4), it acquires the key information through the communication line (S5). Thus, the downloading of the content data and the key information is completed. After that, when the user manipulates the remote controller (not shown) and instructs the playback of the content downloaded from the input control unit 9 (S6), the playback is started by using the stored content data and key information (S7).

According to the embodiment as mentioned above, the high safety system which downloads the key information after the downloading of the content data was completed may be realized.

That is, in the case where the encrypted content is obtained by downloading by a tolled service or the like and stored into the storage unit 4, when the downloading of the content data is started, ordinarily, the downloading is completed as it is and the content data is stored into the storage unit 4. However, a case where the downloading cannot be performed to the end due to a cause of the line, terminal, user, or the like is presumed. As a case where the downloading cannot be performed to the end, there is also a line abnormality or the like. However, there is also a case such as interruption of the downloading due to a change of a mind of the user, malicious interference with the sending of a download completion notification to the distributing side, or the like.

Generally, since a right for monitoring occurs to the user at a point of time when a purchasing process of the content has been executed, there is considered a method whereby the key information is downloaded into the receiver 10 at this time point and, thereafter, the downloading of the content data is started. However, if it is interfered that the downloading completion notification is reported to the distributing side as mentioned above, the downloading of the content is not completed. There is a risk that when the monitoring of five contents or the like per month is contracted, the monitoring can be illegally performed by the key information which has already been acquired.

To raise the safety of the distributor's side against such illegality, it is effective to download the key information for the encryption into the receiver after confirming the completion of the downloading of the content data.

Embodiment 2

An embodiment 2 will now be described. A description about the same elements as those described in the embodiment 1 is omitted. In the embodiment 2, a case of a progressive downloading will be described. According to the progressive downloading, generally, the downloading of the content data is started and if a certain amount of data may be stored after the elapse of a short time, while continuing the downloading of the content data, the playback may be started in parallel from the beginning of the content which has already been stored. According to such a system, a waiting time of the user which is required for downloading may be shortened.

Figure 4A:
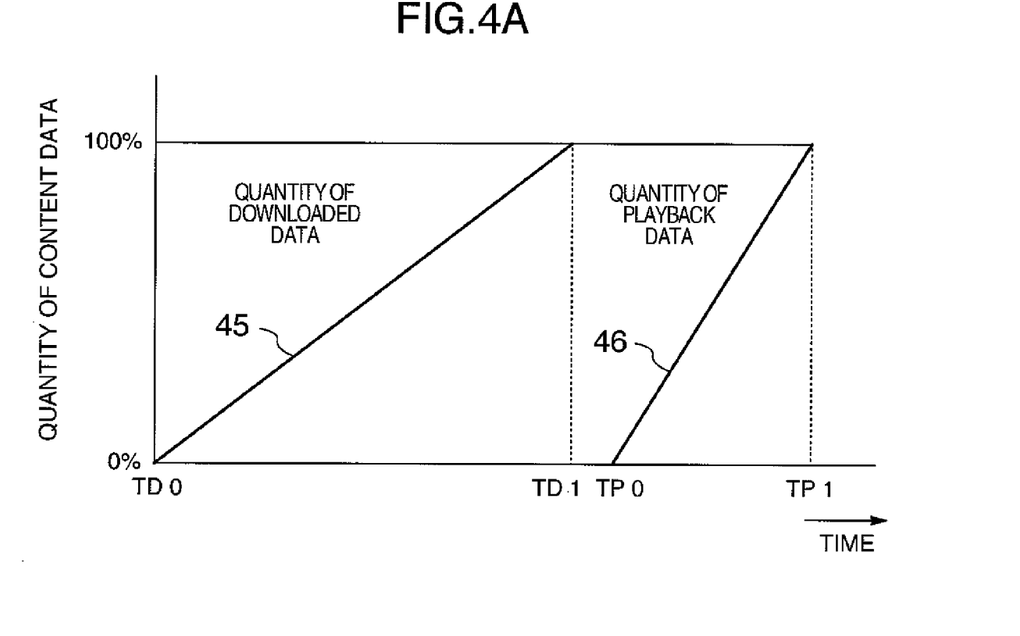
FIG. 4A is a graph showing the ordinary downloading operation.
Figure 4B:
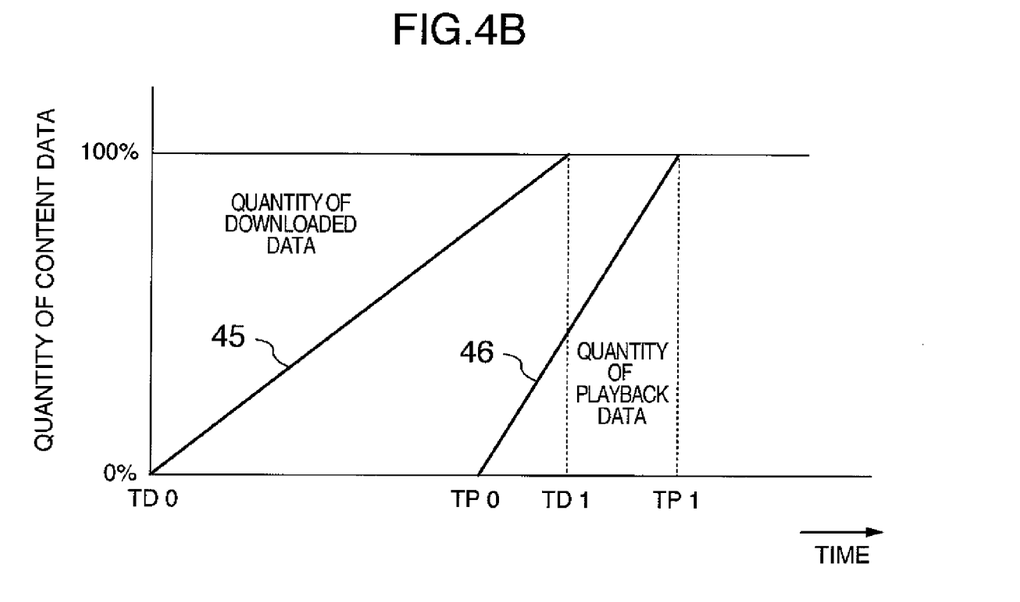
FIG. 4B is a graph showing the progressive downloading operation.

FIGS. 4A and 4B are graphs for comparing and describing the operation in the ordinary downloading system and the operation in the progressive downloading system.

FIG. 4A is a graph showing a time-dependent relation between the downloading and the playback operation in the ordinary downloading system. An axis of ordinate of the graph indicates a data quantity of the content which is downloaded and an axis of abscissa indicates a time. TD0 indicates timing for start of the downloading and TD1 indicates timing for completion of the downloading. TP0 indicates timing for start of the playback and TP1 indicates timing for end of the playback.

In the graph of FIG. 4A, when the downloading is started from TD0, a quantity of the downloaded data increases gradually and the downloading is completed at TD1. At this point of time, the content of 100% is stored in the storage unit 4. After that, the playback is started at TP0. The playback has been completed at TP1. As shown in FIG. 4A, graphs 45 and 46 do not overlap on a time base. In the ordinary downloading system, the playback cannot be executed during the downloading. Inclinations of the graphs 45 and 46 in FIG. 4A are not limited to those shown in FIG. 4A but differ depending on a downloading speed and a playback speed of the data. This is similarly true of FIG. 4B.

Subsequently, FIG. 4B is a graph showing a time-dependent relation between the downloading and the playback operation in the progressive downloading system. In FIG. 4B, TD0, TD1, TP0, and TP1 denote timing similar to those in FIG. 4A.

As shown in FIG. 4B, when the downloading is started from TD0, the playback has been started from TP0 before TD1 when the downloading is completed. The playback is also continued after TD1 when the downloading is completed. The playback has been completed at TP1. By overlapping the downloading and the playback as mentioned above, the playback may be started early and the total time may be shortened.

In the following description, in the embodiment 2 in the case where the progressive downloading is used, when a playback instruction of the content is inputted from the user to the input control unit 9, the CPU 8 acquires the key information from the server. However, when the playback instruction of the content is inputted to the input control unit 9, the CPU 8 compares and calculates the present quantity of downloaded data, a downloading data speed, and a playback speed of the playback data. Only when the speed of TD1 is faster than that of TP1, the CPU 8 may request the server to acquire the key information. The CPU 8 compares and calculates the present quantity of downloaded data, a downloading data speed, and a playback speed of the playback data. When the speed of TD1 is slower than that of TP1, since the data cannot be correctly played back, the CPU 8 does not request the server to acquire the key information.

When the playback instruction of the content is not inputted to the input control unit 9 during the downloading, the CPU 8 confirms the completion of the downloading of the content data and, thereafter, downloads and acquires the key information from the server.

When the user instructs the acquisition of the key information by the remote controller or the like (not shown) through the input control unit 9, the CPU 8 acquires the key information from the server and stores into the storage unit 4.

Figure 3:
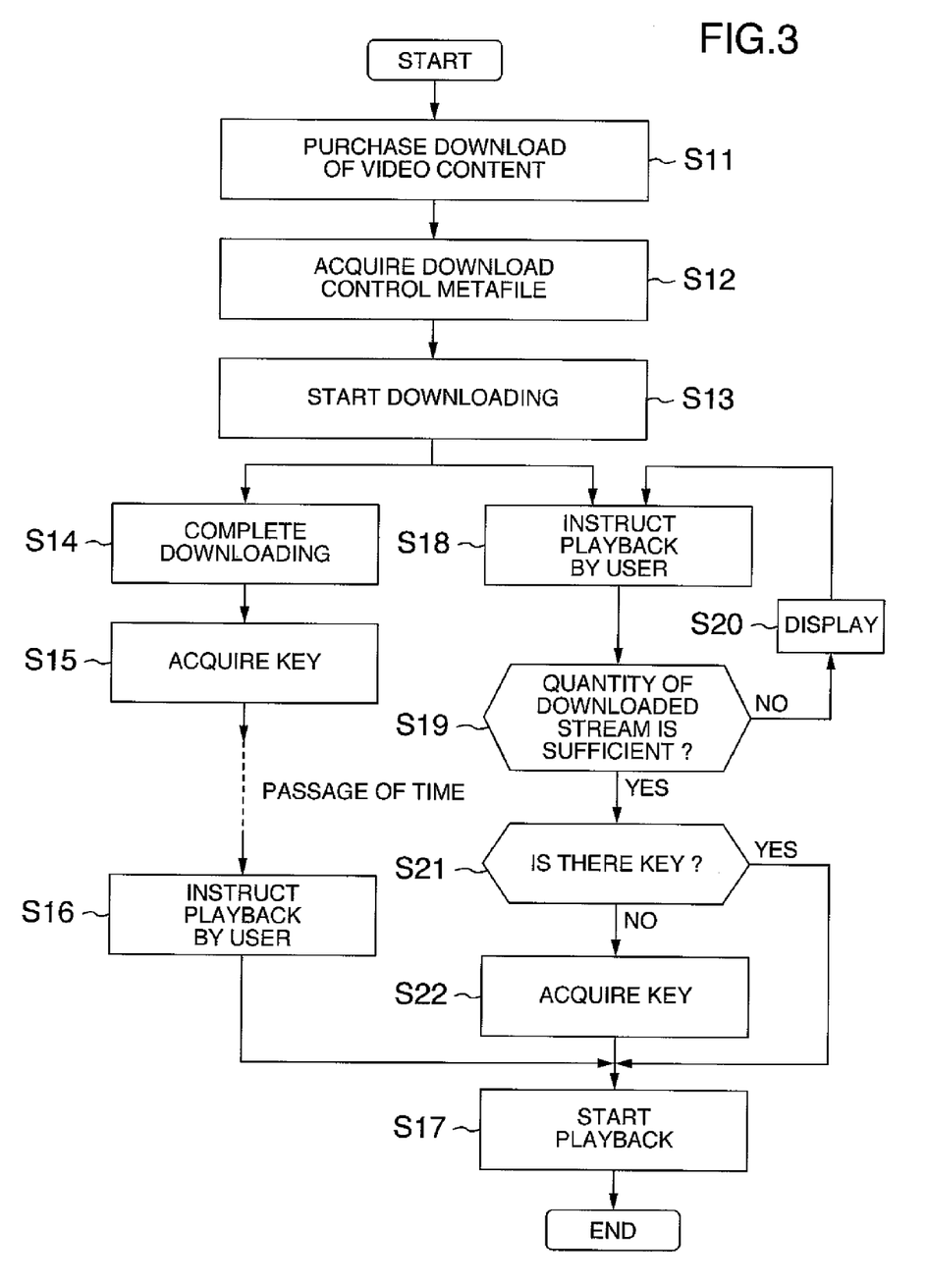
FIG. 3 is a flowchart showing the operation of a progressive downloading process in an embodiment 2.

The embodiment will be described hereinbelow by using the flowchart shown in FIG. 3.

When the content is purchased by the downloading service (S11), the receiver 10 acquires the download control metafile (S12) and starts the downloading of the content data in accordance with it (S13). When the downloading is normally completed after that (S14), the key information is acquired through the communication line (S15). Thus, the downloading of the content data and the key information is completed. After that, when the user instructs the playback of the content (S16), the playback is started (S17).

After the downloading of the content data was started (S13), when the user instructs the playback before the downloading is completed (S18), the data quantity of the content which has already been stored is confirmed and if the downloading was continued at the same speed, it is assumed that the playback has been started in parallel from the beginning, it is determined whether the playback can be performed to the end of the content (S19). Specifically speaking, the present quantity of downloaded data, the downloading data speed, and the playback speed of the playback data are compared and calculated, thereby calculating whether the speed of TD1 is faster than that of TP1.

When the data quantity of the stored content is insufficient and if it is decided that at the time of presumption of the playback end at the present playback speed, the downloading of the content is not finished and the playback cannot be performed to the end, a message showing such a fact is displayed onto the display device 7 and the user is notified of it, thereby promoting the user to instruct the playback start after a little while (S20). If the quantity of the stored data is sufficient and if it is decided that at the time of presumption of the playback end at the present playback speed, the downloading of the content has been finished and the playback can be performed to the end, subsequently, it is confirmed whether the key information for the encryption has been acquired in the receiver 10 (S21). If the key information is not acquired yet, the key information is acquired through the communication line (S22). Thus, the playback of the content can be started (S17). In the case of using the progressive downloading system, even during the downloading, when the user instructs the playback, if there is no key information in the receiver 10, a process for acquiring it through the communication line can be added, so that the content can be played back.

As mentioned above, according to the embodiment, the receiver in which the content of the encrypted video image or audio sound is downloaded from the communication line and stored, the content is played back by using the key information which has separately been downloaded, the safety is high, the progressive downloading may be also performed, and it may be easily used may be realized. Thus, it is promoted to provide the content of high quality and a new content service business or the like may be realized.

According to the embodiment, when the user instructs the start of the playback before the downloading of the content data is completed, by acquiring the key information at that time point, both of the improvement of the security and the use convenience may be assured.

That is, the system in which by deciding the procedures for downloading the content data and for acquiring the key information, the illegal use of the content is eliminated, the provider of the content may provide the content of high quality, it also copes with the playback start at a time point on the way of the downloading, and it may be easily used may be provided.

Figure 5:
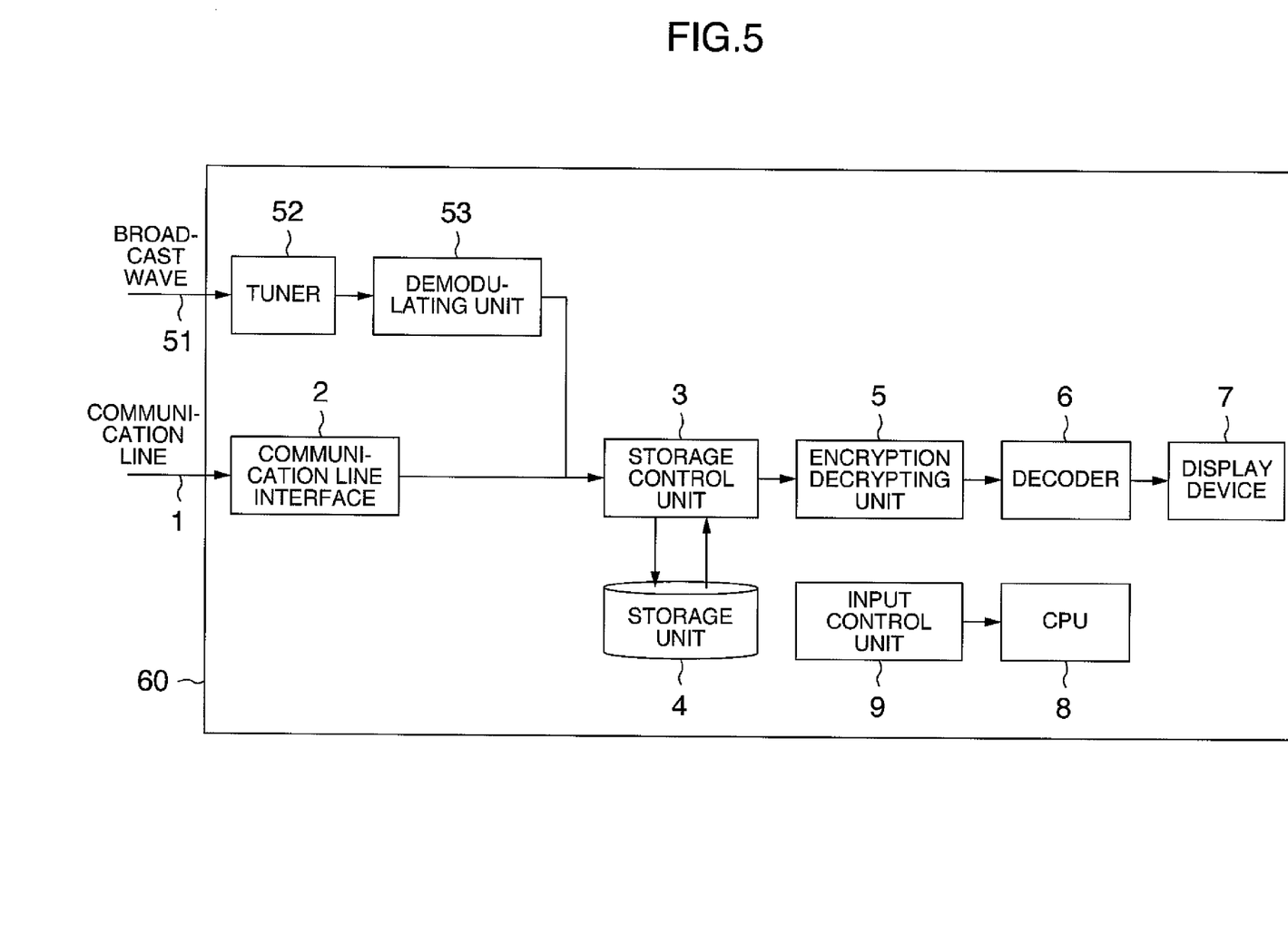
FIG. 5 is a block diagram showing a construction of a broadcast receiver according to the invention.

In the receiver 10, the case of acquiring both of the content data and the key information from the communication line is presumed. However, in a broadcast receiver 60 as shown in FIG. 5, the content data may be acquired from another media such as a broadcast wave or the like and the key information may be acquired from the communication line.

In the embodiment, it is confirmed whether the key information exists in the receiver and if the key information exists, the playback is executed. However, if the term of validity has been set for the key information, when starting the playback, the term of validity of the key information is confirmed and compared with the current time/date. If the term of validity has been expired, new key information is acquired again via the communication line. Thus, the content may be properly played back within the term of validity of the key information.

Although the embodiments 1 and 2 have been described by using the simple receiver, the embodiment may be also applied to a receiver constructed as a broadcast receiver. As a construction of the broadcast receiver, for example, as shown in FIG. 5, the broadcast receiver 60 constructed by adding a tuner 52 and a demodulating unit 53 to the component elements 1 to 9 of the receiver 10 shown in FIG. 1 may be mentioned.

In the broadcast receiver 60, a broadcast wave 51 is inputted to the tuner 52, is converted into a transport stream in the demodulating unit 53, and is inputted to the storage control unit 3. After that, there is a case where it is stored into the storage unit 4 or a case where it is not stored but passes directly through the encryption decrypting unit 5 and the decoder 6 and is played back by the display device 7.

Although the invention has been disclosed above with respect to the embodiments, the invention is not limited to them but it is obvious to persons with ordinary skill in the art that many various changes and modifications are possible within the spirit and the scope of Claims of the invention.

DESCRIPTION OF REFERENCE NUMERALS

1 . . . Communication line
2 . . . Communication line interface
3 . . . Storage control unit
4 . . . Storage unit
5 . . . Encryption decrypting unit
6 . . . Decoder
7 . . . Display device
8 . . . CPU
9 . . . Input control unit 10 . . . Receiver
45 . . . Quantity of downloaded data
46 . . . Quantity of playback data
51 . . . Broadcast wave
52 . . . Tuner
53 . . . Demodulating unit
60 . . . Broadcast receiver
100 . . . Server
200 . . . IP network

The invention claimed is:

1. A content playback apparatus which downloads and playbacks content data comprising:
    a receiving unit being adapted to download said content data which is encoded and key information for decoding said content data;
    a storage unit being adapted to store said downloaded content data;
    a decoding unit being adapted to decode an encryption of said stored content data by using said key information;
    an input unit being adapted to receive a playing back instruction; and
    a control unit being adapted to control said receiving unit and said decoding unit;
    wherein controlling states of said control unit includes,
    a first state that said key information is obtained after all downloads of said content data have been completed and said encryption of said content data is decoded to enable a playback; and
    a second state that said key information is received before a all downloads of said content data have been completed, and said encryption of said content data is decoded to enable a playback before all downloads of said content data have been completed, if said playback instruction is received from said input unit during the downloading of said content data.

2. A content playback apparatus according to claim 1, wherein
    if said playing back instruction is received from said input unit during the downloading of said content data, said control unit determines whether a quantity of said downloaded content data is equal to a sufficient quantity to play back, and if it is equal to the sufficient quantity, said control unit receives said key information.

3. A content playback apparatus according to claim 2, wherein said determination is performed on the basis of the downloaded quantity, a downloading speed, and a playback speed.

4. A content playback apparatus according to claim 2, wherein said determination is performed on the basis of a residual time which is obtained from a downloaded quantity and a downloading speed and which is necessary for downloading and a time necessary for playing back the whole quantity of said content data.

5. A content playback apparatus according to claim 1, wherein
    if said playing back instruction is received from said input unit during the downloading of said content data, said control unit determines whether a quantity of said downloaded content data is equal to a sufficient quantity to play back, and if it is not equal to the sufficient quantity, said control unit does not receive said key information.

6. A content playback apparatus according to claim 1, wherein
    even if the play back instruction was received from said input unit, in the case where a term of use is provided for said received key information and said term of use has expired at a point of time when the playback has been instructed, said control unit receives again the key information for decoding said downloaded content.

7. A content playback method in a content playback apparatus which downloads and playbacks content data, comprising the steps of:
    downloading said content data which is encoded;
    obtaining key information for decoding said content data;
    storing said downloaded content data;
    decoding an encryption of said stored content data by using said key information;
    in a first state, obtaining said key information after all downloads of said content data have been completed, and decoding said encryption of said content data to enable a playback;
    in a second state, if said playback instruction is received from an input unit during the downloading of said content data, receiving key information before all downloads of said content data have been completed, and decoding said encryption of said content data to enable a playback before all downloads of said content data have been completed.

8. A content playback method according to claim 7, wherein
    if said playback instruction is received from said input unit during the downloading of said content data, whether or not a quantity of said downloaded content data is equal to a sufficient quantity to play back is determined, and if it is equal to the sufficient quantity, said key information is received.

9. A content playback method according to claim 8, wherein
    said determination is performed on the basis of the downloaded quantity, a downloading speed, and a playback speed.

10. A content playback method according to claim 8, wherein
    said determination is performed on the basis of a residual time which is obtained from a downloaded quantity and a downloading speed and which is necessary for downloading and a time necessary for playing back the whole quantity of said content data.

11. A content playback method according to claim 7, wherein
    if said playback instruction is received from said input unit during the downloading of said content data, whether or not a quantity of said downloaded content data is equal to a sufficient quantity to play back is determined, and if it is not equal to the sufficient quantity, said key information is not received.

12. A content playback method according to claim 7, wherein
    even if the playback instruction was received from said input unit, in the case where a term of use is provided for said received key information and said term of use has expired at a point of time when the playback has been instructed, the key information for decoding said downloaded content is received again.

* * * * *